US008554674B1

(12) United States Patent
Subealdea, Jr. et al.

(10) Patent No.: US 8,554,674 B1
(45) Date of Patent: Oct. 8, 2013

(54) TRANSFER CALLER INTO SPEECH MAKE-A-PAYMENT TRANSACTION

(75) Inventors: Frank Subealdea, Jr., San Antonio, TX (US); Dik Moore, San Antonio, TX (US); Thomas Chudanov, San Antonio, TX (US); Hector Castillo, San Antonio, TX (US); Linda Karen Leach, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 328 days.

(21) Appl. No.: 11/591,040

(22) Filed: Oct. 31, 2006

(51) Int. Cl.
  *G06Q 40/00* (2012.01)
(52) U.S. Cl.
  USPC .............................. 705/40; 705/35
(58) Field of Classification Search
  USPC ....................................... 705/40, 35
  See application file for complete search history.

(56) References Cited

U.S. PATENT DOCUMENTS

| | | | |
|---|---|---|---|
| 5,164,981 A | 11/1992 | Mitchell et al. | |
| 5,179,585 A * | 1/1993 | MacMillan et al. | 379/88.01 |
| 5,825,856 A * | 10/1998 | Porter et al. | 379/93.12 |
| 7,035,388 B2 | 4/2006 | Kurosaki | |
| 7,298,740 B2 * | 11/2007 | Sbisa et al. | 370/389 |
| 2002/0064149 A1 * | 5/2002 | Elliott et al. | 370/352 |
| 2002/0087323 A1 | 7/2002 | Thomas et al. | |
| 2003/0053614 A1 * | 3/2003 | Niiya et al. | 379/265.01 |
| 2005/0198534 A1 | 9/2005 | Matta et al. | |
| 2006/0282662 A1 * | 12/2006 | Whitcomb | 713/156 |
| 2007/0115940 A1 * | 5/2007 | Kamen et al. | 370/352 |

OTHER PUBLICATIONS

Communications_Today; "Small Vendor Has Big Aspirations for Class-Independent Switch"; Dec. 15, 1998, ISSN: 1079-669X.*
Anonymous; "OGERO landline network covers 95 per cent of Lebanon"; Jan. 4, 2005; Journal Code: BWBA.*
O'Toole, Tom; "Hotel technology Handbook 2004"; Jun. 15, 2004; Lodging Hospitality; ISSN: 0148-0766.*
Chu-Carroll, J. et al., "Vector-based Natural Language Call Routing," *Computational Linguistics*, 1999, 25(3), 361-388.
Huang, Q. et al., "Automatic Call-Routing without Transcriptions," *School of Information Systems, University of East Anglia*, 2003, 4 pages.
Oberteuffer, J.A., "Commercial applications of speech interface technology: An industry at the threshold," *PNAS U.S.A.*, 1995, 92, 10007-10010.
Pinedo, M. et al., "Call Centers in Financial Services: Strategies, Technologies, and Operations," Melnick, E. (ed.), *Creating Value in Financial Services*, Kluwer Academic Press, 1999, Chp. 18, 357-388.
Reichl, W. et al., "Language Modeling for Content Extraction in Human-Computer Dialogues," *Lucent Technologies Bell Laboratories*, 1998, 4 pages.

* cited by examiner

Primary Examiner — Edward Chang
(74) Attorney, Agent, or Firm — Brooks, Cameron & Huebsch, PLLC

(57) ABSTRACT

A user calling a payment center has the option of using an automated speech recognition payment system or a human representative to make the payment. If the user selects to make a payment using a human representative, the representative may, at some point, transfer the user into the automated speech recognition payment system. If the user has already been authenticated, he may not need to re-authenticate himself to the system. If the user selects to make a payment the automated system, and then gets transferred to a human representative during the payment process, the representative may, at some point, transfer the user into the automated speech recognition payment system. Again, if the user has already been authenticated either by the system initially or by the representative, he may not need to re-authenticate himself to the system.

12 Claims, 6 Drawing Sheets

TRANSFER CALLER INTO SPEECH MAKE-A-PAYMENT TRANSACTION

CROSS-REFERENCE TO RELATED APPLICATIONS

This application is related by subject matter to the inventions disclosed in the following commonly assigned applications, the entirety of which are hereby incorporated by reference herein: U.S. patent application Ser. No. 11/591,166, and U.S. patent application Ser. No. 11/591,020, each filed on Oct. 31, 2006 and each entitled "Transfer Caller Into Speech Make-A-Payment Transaction."

BACKGROUND

Speech recognition systems are used in customer service and processing environments, such as call centers and payment collection and processing centers. For example, a user wishing to make a payment may call into a payment center, for example, and have the option to interact with a speech recognition payment system or a human representative. Interaction with the speech recognition payment system does not require a human representative, and therefore is less expensive for the entity taking the payments. However, many users forgo the speech recognition payment system and instead use the human representative to make a payment, thereby increasing the cost to the payment-taking entity.

Additionally, a human representative may transfer a user's call to an automated system, but the user must re-authenticate through a top-level identification and authorization menu method before access is granted.

In view of the foregoing, there is a need for systems and methods that overcome the limitations and drawbacks of the prior art.

SUMMARY

A user calling a payment center has the option of using an automated speech recognition payment system or a human representative to make the payment. If the user selects to make a payment using a human representative, the representative may, at some point, transfer the user into the automated speech recognition payment system. If the user has already been authenticated, he may not need to re-authenticate himself to the system.

If the user selects to make a payment in the automated system, and then gets transferred to a human representative during the payment process, the representative may, at some point, transfer the user into the automated speech recognition payment system. Again, if the user has already been authenticated either by the system initially or by the representative, he may not need to re-authenticate himself to the system.

When a user is transferred from a representative to the automated system, the user may be transferred to a particular point or transaction in the automated system, such as directly to a payment collection point, as opposed to a top level authentication point or main menu, e.g., requiring authentication or other data previously supplied by the user. Thus, the user can be transferred into numerous entry points of the automated system (e.g., Top Level Prompter, Options, Authentication, Transactions) depending on the application. A security token is desirably passed from the representative into the automated system, allowing the user to bypass redundant authentication. The user intent may also be passed with the call, thus reducing the levels of options the user must listen to. If the representative forgets to authenticate the user prior to transferring the user into the automated system, the security token will reveal this to the system which may ask the user to authenticate.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
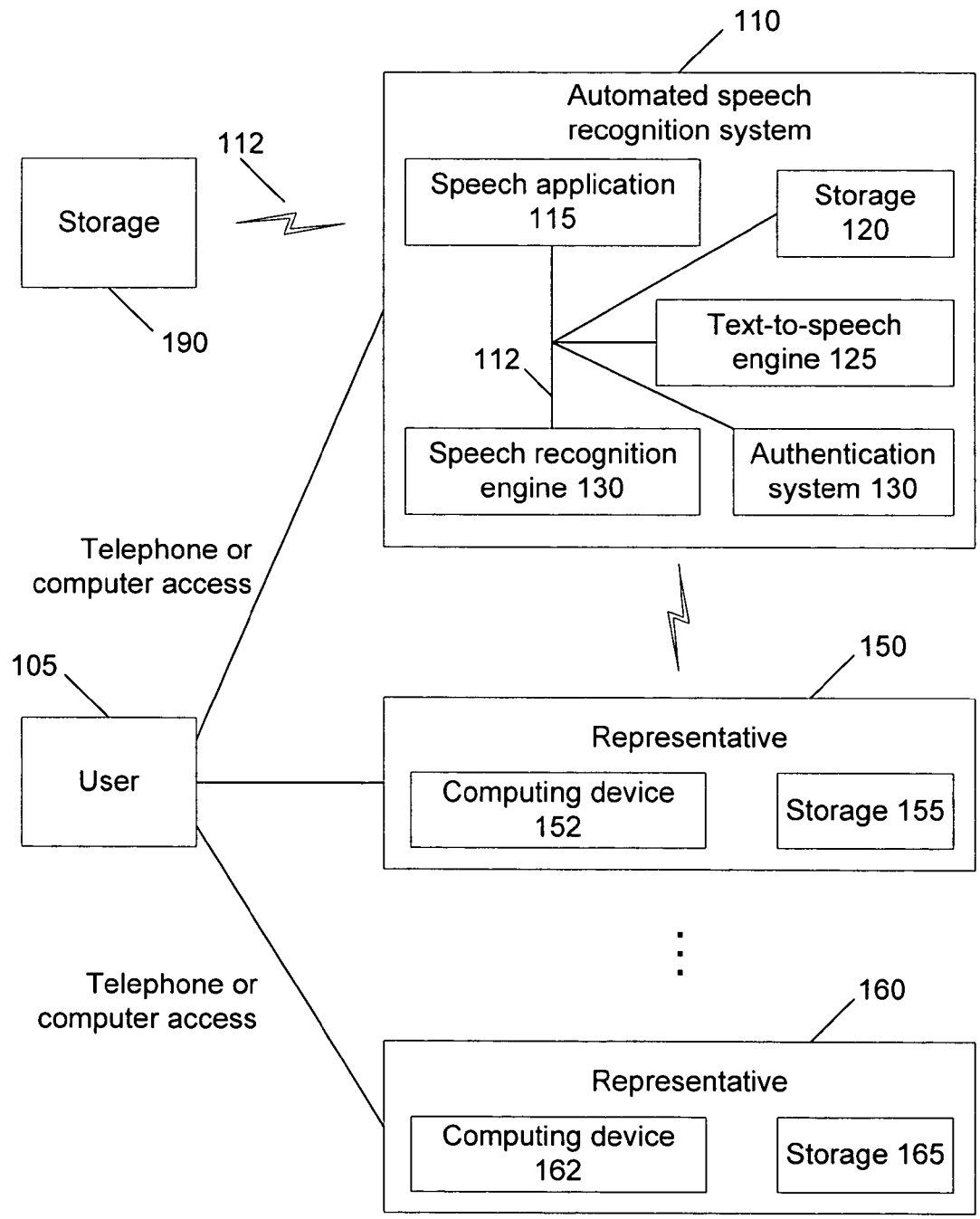
FIG. 1 is a diagram of an example call processing system.

FIG. 1 is a diagram of an example call processing system. A user 105 calls or otherwise accesses a processing environment 100, such as a payment center. The user has the option of using an automated speech recognition system 110 (e.g., for making a payment) or communicating with a human representative 150 (e.g., to make the payment). The automated speech recognition system 110 comprises a speech application 115 which may play audio or provide other data to a user 105, collect and store audio and other data from a user 105, and analyze the collected audio and data. The audio or other data that is provided to the user 105 may be have been previously generated and stored in a memory, either locally 120 or remotely 190, for example, over a network 112, such as an intranet or internet. Text-to-speech engines 125 may also be provided and used to provide audio or data to the user 105. Speech recognition engines 130 may be used to collect and analyze audio and data from the user 105. Data and call activity may be stored as well. The speech recognition system 110 may be a web-based application or reside locally or remotely to the processing environment.

An authentication system 130 is also provided to identify and authenticate a user so he may access all or parts of the automated speech recognition system. Conventional identification and authentication techniques and processes may be used.

Figure 2:
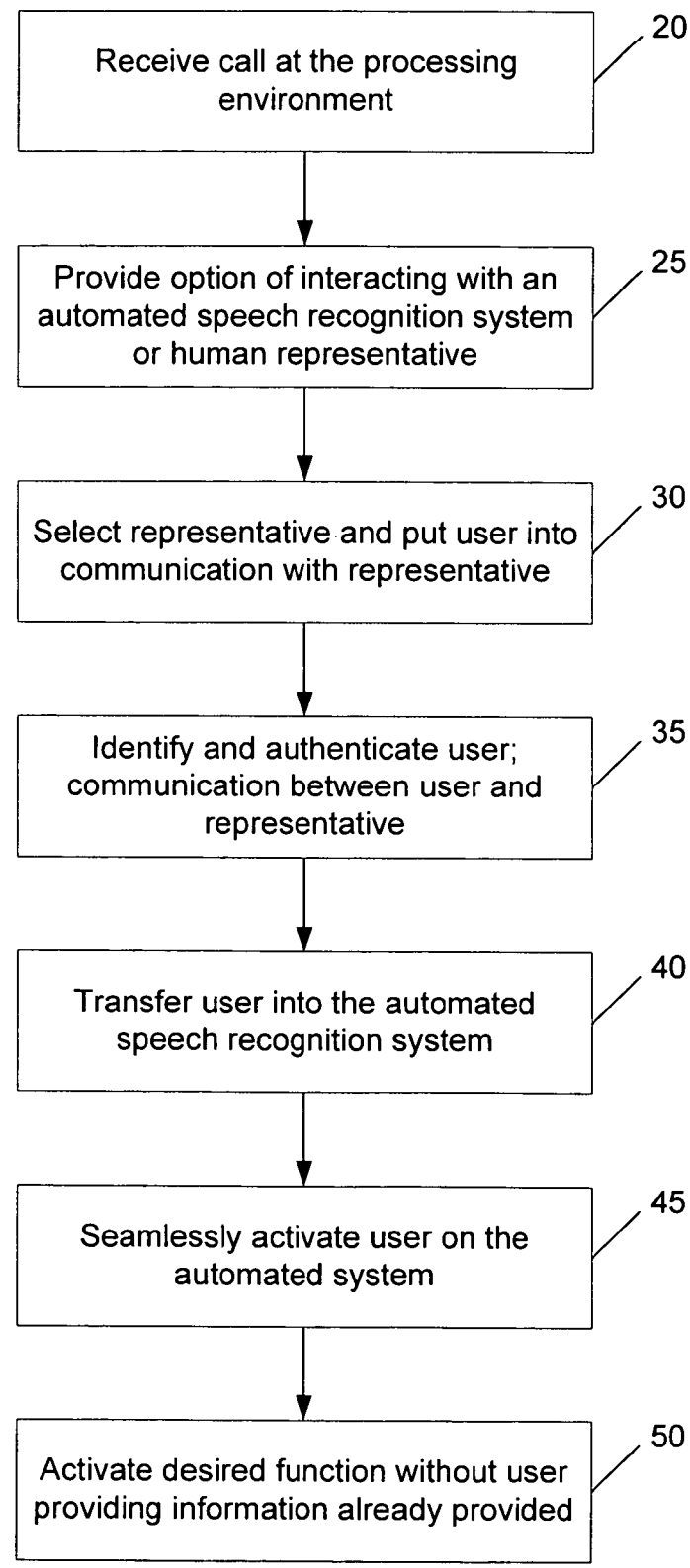
FIG. 2 is a flow diagram of an example method of call processing.

The human representative 150 may be local or remote to the processing environment and in communication with the user 105 and the automated speech recognition system 110 via a telephone network or a computer network or both. The human representative 150 uses a computing device 152 to access data to be provided to the user 105, to collect and store data from the user 105, and to analyze data received from the user 105. Any number of human representatives may be used, although only two representative 150, 160 are shown in FIG. 2. The computing devices 152, 162 may be part of a network such as an intranet or internet, for example. Memory or other storage devices 120, 155, 165, 190 may be used to store data that has been received from the user 105 as well as other data used in payment processing.

FIG. 2 is a flow diagram of an example method of call processing in which the user selects to interact with the human representative. At step 20, a user calls into the processing environment, such as a payment center, via e.g., a toll-free or local telephone number or over the internet. At step 25, the user is given the option of selecting to interact with a human representative or an automated speech recognition system without the involvement of a representative. The user selects to make a payment using a human representative, and the user is then put into communication with the representative, at step 30.

At step 35, the user may identify and authenticate himself to the representative. Subsequently, the user and representative communicate. At some point, step 40, the representative may, desirably with the user's consent, transfer the user into the automated speech recognition system.

If the user has already been authenticated by the representative, he desirably does not need to re-authenticate himself to the automated system. At step 45, the user is activated on the automated system, and desirably integrated seamlessly, such that the representative-collected information is provided to the automated system. The desired function may proceed immediately, at step 50, without the need for the user to provide any information he may have already provided.

Because the user has already been authenticated, the representative may transfer the user directly to any authorized point or function in the automated system, and not just a top level menu or an identification and authentication function. When the call is transferred, login data may be passed from the representative's space in the processing environment into the automated system to log the user into the system automatically.

These features allow a representative to instruct a user about self-servicing their payments and then transfer their call into an automated speech recognition payment system where the user will be able to immediately use the service. This provides for immediate reinforcement of the representative's message and instructions.

Figure 3:
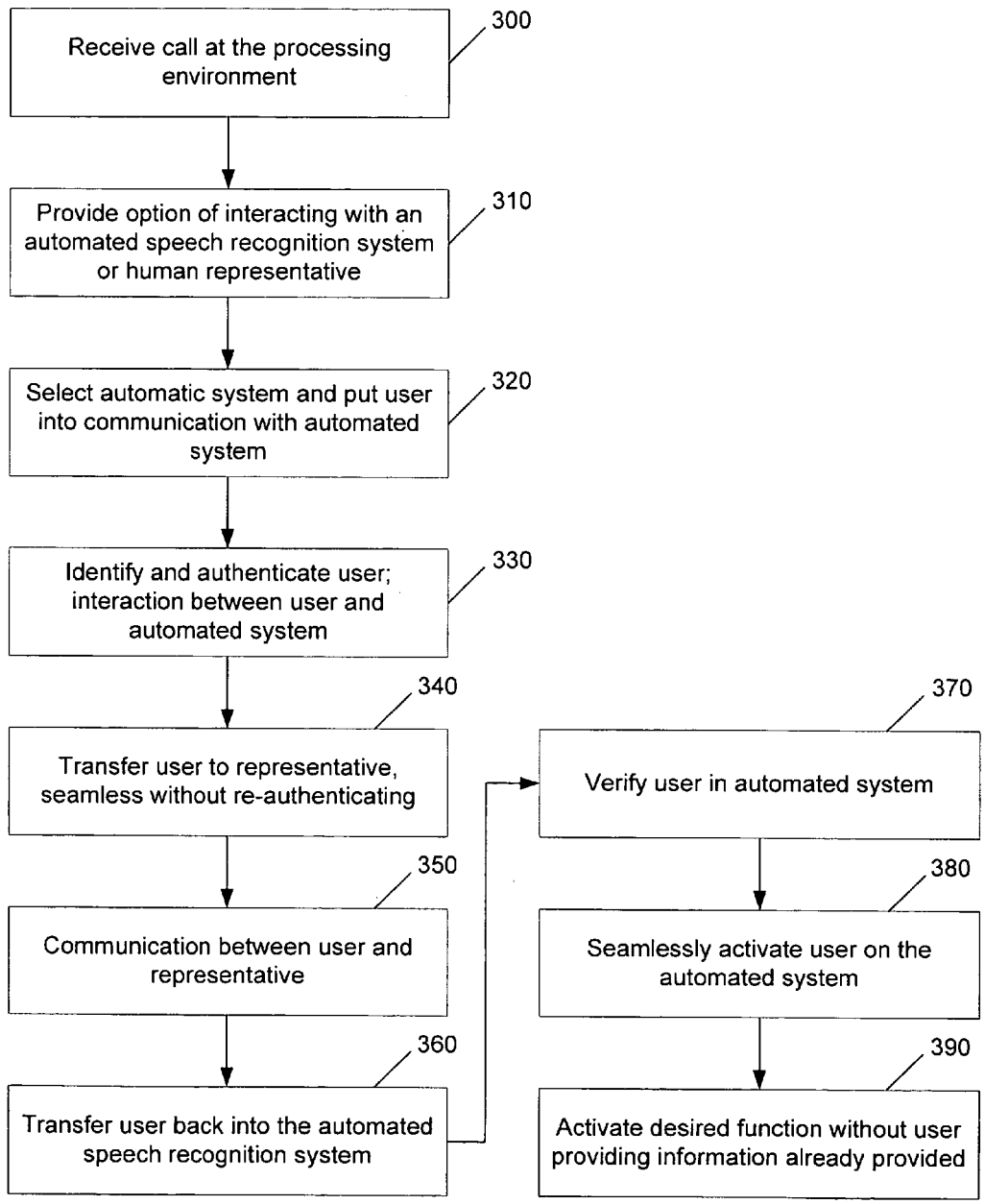
FIG. 3 is a flow diagram of another example method of call processing.

FIG. 3 is a flow diagram of an example method of call processing in which the user selects to interact with the automated speech recognition payment system. At step 300, a user calls into the processing environment, such as a payment center, via e.g., a toll-free or local telephone number or over the interne. At step 310, the user is given the option of selecting to interact with a human representative or an automated speech recognition system without the involvement of a representative. The user selects to make a payment using the automated speech recognition system, and the user is then put into communication with the system at step 320.

At step 330, the user may identify and authenticate himself to the system. Subsequently, the user interacts with the system. At some point, step 340, the user requests to communicate with a representative, and is transferred to a representative.

If the user has already been authenticated by the system, this information is desirably passed to the representative so that the user does not need to re-authenticate himself to the representative. At step 350, the user and representative communicate. At some point, step 360, the representative may, desirably with the user's consent, transfer the user back into the automated speech recognition system.

For example, when the representative transfers the call back to the automated system, a security token, created when the user initially logged in for example, is checked to see if it is valid. If so, then the user is verified at step 370, and authentication is attempted by the system without additional user input, and if successful, the user goes directly to a predetermined point in the system or a point specified by the transferring representative (e.g., a make a payment point in the automated system). If the user is not verified, the authentication process is desirably run, and if successful, the user is then sent to the predetermined point in the system or the point specified by the transferring representative. The system desirably uses a security token that is passed to it to determine whether authentication is satisfied or whether the user will be asked to provide authentication data.

At step 380, the user is re-activated on the automated system, and desirably integrated seamlessly, such that any representative-collected information is provided to the automated system. The desired function may proceed immediately, at step 390, without the need for the user to provide any information he may have already provided.

Similar to the process described with respect to FIG. 2, the representative may transfer the user directly to any authorized point or function in the automated system, and not just a top level menu or an identification and authentication function.

Thus, if the user selects to make a payment in the automated system, and then gets transferred to a human representative during the payment process, the representative may, at some point, transfer the user back into the automated speech recognition payment system. If the user has already been authenticated either by the system initially or by the representative, he may not need to re-authenticate himself to the system. For example, the system will automatically re-authenticate the user or receive an indication that authentication is not necessary.

According to an example, the user's identification number (e.g., a membership number) and a passcode, such as a PIN, are used for initial authentication, and an authentication level may be determined. The authentication level may provide a certain amount of access to the system, based on the level. For example, a user (e.g., a customer) may access different functionality based upon the information that they have provided, such that the user may access one level of functionality with some minimal identification data input. If the user desires to access functionality requiring more than the minimal data items provided, the user may be allowed to provide the additional data, and if successful, granted access to this more secured functionality. The user desirably can set a preference to require the higher security level for all application functionality. A date/time stamp may also be provided at log in, and used in generating a security token, for example, using known techniques.

When the user gets transferred to the representative, the identification number and the authentication level desirably get passed to the representative. Other information such as an account number or account type may be passed as well, along with a social security number for the user, his date of birth, or his member number, for example.

As noted above, at some point, the representative sends the user to the automated system along with the identification number and a token (e.g., based on a date/time stamp) to re-authenticate the user automatically at the system, without requiring the user to re-enter data. The security token may be a base 64 token in a variable length field, for example. An ending delimiter, such as an equal sign character "=" may be included in the field data for the token. Thus, for a user who initially went to the system and then got sent to a representative, the representative can then put the user back into the system, without re-authenticating or entering previously provided identification data. The operational capacity is thereby increased by eliminating the need for a user to re-authenticate when transferred from a representative to the automated payment system.

Figure 4:
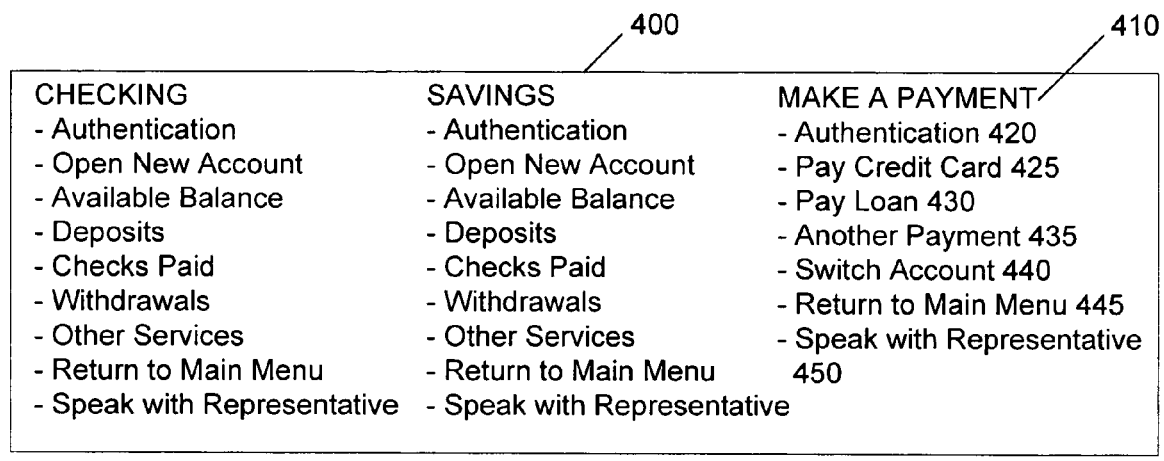
FIG. 4 is a diagram of example menu options in an example automated speech recognition payment system.

FIG. 4 is a diagram of example menu options 400 in an automated speech recognition payment system. When a user calls in to the automated system, he is able to select make a payment 410 from among other high level options, such as checking and savings Within the make a payment option 410, the user can select various functions such as authentication 420, make various types of payments 425, 430, 435, switch accounts 440, return to a main menu or a higher level menu 445, or access a representative 450, for example. Desirably, when a representative transfers a user to the automated system, the user is already authenticated and is sent directly to another function instead of authentication 420.

When a user is transferred from a representative to the automated system, the user may be transferred to a particular point or transaction in the automated system, such as directly to a payment collection point 425, 430, 435, as opposed to a top level authentication point 420 or a main or higher level menu 400, 410, e.g., requiring authentication or other data previously supplied by the user.

A code may also be provided by the representative so that the user gets sent to a particular point in the system based on the code, rather than at the beginning (as having first been authenticated) or to another predetermined point in the system. For example, the representative may transfer the user into the automated system with code 430, which would automatically put the user into the "pay loan" function.

It is contemplated that the user can access the system via a telephone using speech, or other techniques, such as using touchtone telephone data entry or the internet. For example, instead of the automated system having speech recognition applications and engines, the system would have applications and engines that recognize and respond to telephone touchtones. Alternatively, the user would access the automated system using a web browser and interact with it accordingly. The user interface would include an option or selection box, for example, that would transfer a user to a representative.

Exemplary Computing and Networking Environments

Figure 5:
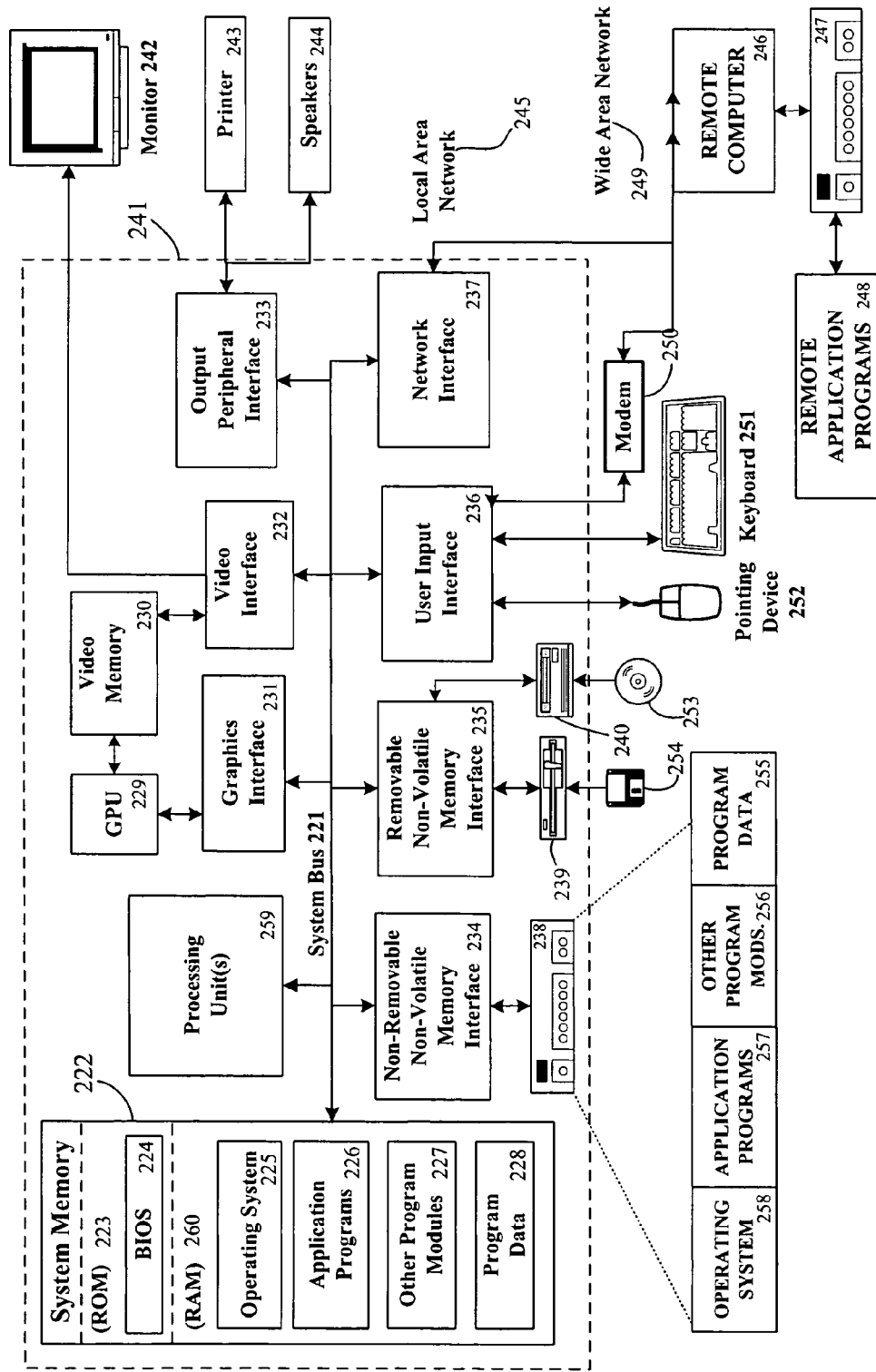
FIG. 5 illustrates a block diagram representing an exemplary computing device environment suitable for use in conjunction with aspects of the invention.

FIG. 5 shows a block diagram representing an exemplary computing device suitable for use in conjunction with implementing aspects of the invention. For example, the computer executable instructions that carry out the processes and methods described herein may reside and/or be executed in such a computing environment as shown in FIG. 5. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 5 illustrates operating system 225, application programs 226, other program modules 227, and program data 228.

The computer 241 may also include other removable/non-removable, volatile/nonvolatile computer storage media. By way of example only, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted in FIG. 5 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 5, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 6:
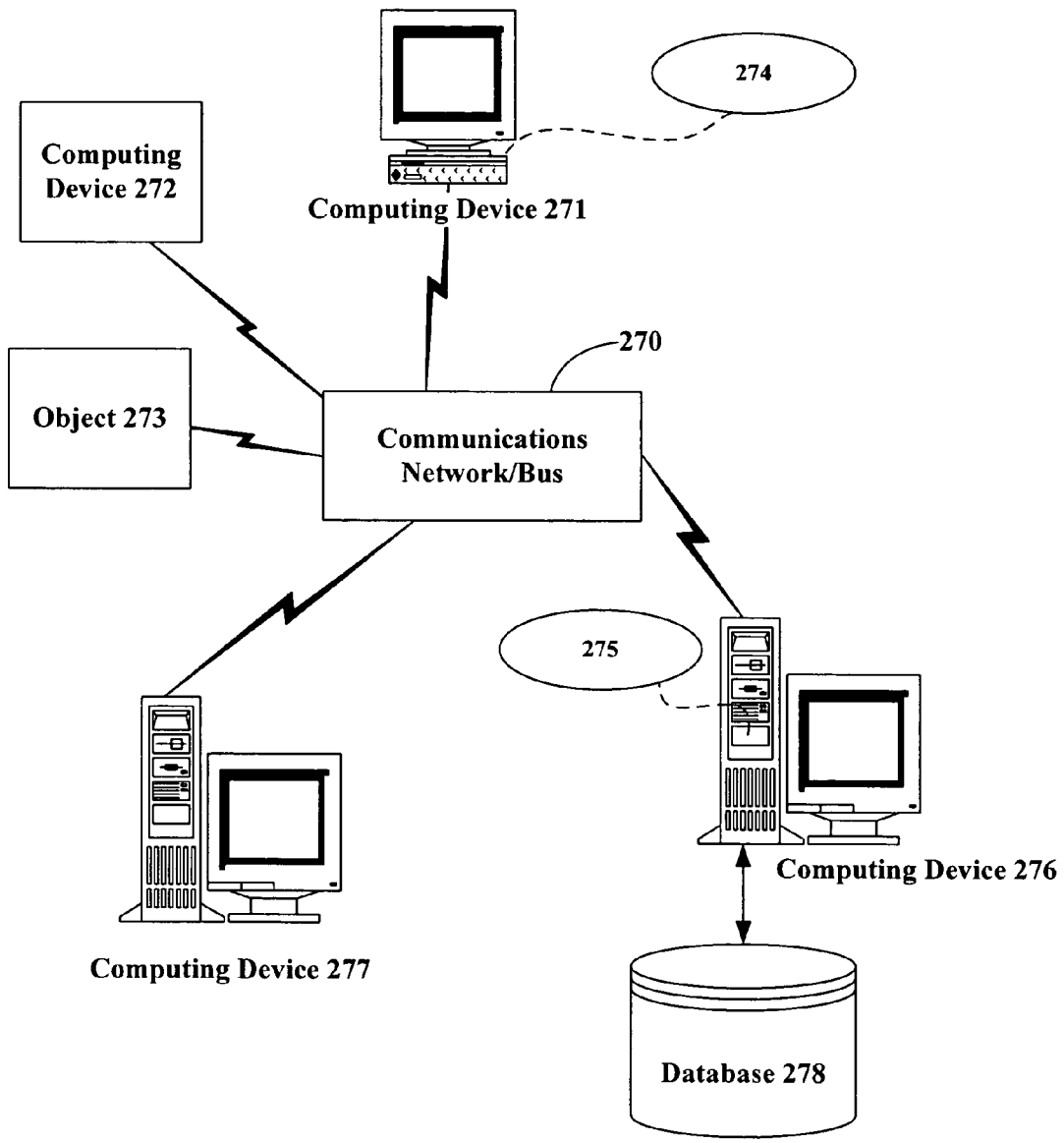
FIG. 6 illustrates an exemplary networked computing environment in which computerized processes may be implemented to perform aspects of the invention.

Referring next to FIG. 6, shown is an exemplary networked computing environment in which many computerized processes may be implemented to perform aspects of the invention. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 6 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 6, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 6 and the further diversification that can occur in computing in a network environment such as that of FIG. 6, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method comprising:
  engaging a user in a communication session;
  authenticating the user for the communication session by receiving user authentication information wherein the user authentication information includes identification data and a passcode;
  communicating with the user through a user connection to an automated telephone system during a first portion of the communication session;

transferring the user connection from the automated telephone system to a communication device associated with a representative during the communication session and providing of the user authentication information for the communication session from the automated telephone system to the representative, wherein transferring of the user connection to the communication device and the providing of the user authentication information enables communication between the user and the representative during a second portion of the communication session without re-authenticating;

transferring the user connection from the communication device associated with the representative back to the automated telephone system during the communication session;

receiving the user authentication information from the representative when transferring the user connection back to the automated telephone system; and receiving a non-initial entry point data token in a customer process from the representative based on the transferring back to the automated telephone system, wherein communicating with the user through the user connection in the automated telephone system during the third portion of the communication session is based on the transferring of the user connection, the receiving of the authentication information, and the receiving of the non-initial entry point data token.

2. The method of claim 1, further comprising:
receiving a call from the user;
providing a prompt to the user to select interaction with the automated telephone system or the representative; and
receiving a selection to interact with the automated telephone system,
wherein the communicating with the user through the automated telephone system is based on the receiving of the selection.

3. A non-transitory computer-readable storage medium having computer-readable instructions comprising instructions, which when executed by a computer, cause the computer to:
engage a user in a communication session; authenticate the user for the communication session by receiving user authentication information wherein the user authentication information includes identification data and a passcode;
communicate with the user through a user connection to an automated telephone system during a first portion of the communication session;
transfer the user connection from the automated system to a communication device associated with a representative during the communication session and provide user authentication information for the communication session from the automated telephone system to the representative, the transfer of the user to the communication device and providing the authentication information enabling communication between the user and the representative during a second portion of the communication session, the second portion occurring after the first portion;
transfer the user connection from the communication device associated with the representative back to the automated telephone system during the communication session;
receive the authentication information from the representative based on the transfer back to the automated telephone system; and
receive a non-initial entry point data token in a customer process from the representative based on the transfer back to the automated telephone system,
wherein communication with the user through the user connection to the automated telephone system during the third portion of the communication session is based on the transfer of the user connection, the receiving of the authentication information, and receipt of the non-initial entry point data token.

4. The computer-readable storage medium of claim 3, further comprising computer-readable instructions, that when executed by the computer, cause the computer to:
receive a call from the user;
provide a prompt to the user to select interaction with the automated system or the representative; and
receive a selection to interact with the automated system,
wherein communication with the user through a user connection to the automated telephone system is based on receipt of the selection.

5. A system comprising:
a processor and memory;
an engagement subsystem deployed in the memory and executed by the processor to engage a user in a communication session;
an authentication subsystem deployed in the memory and executed by the process to authenticate the user for the communication session by receiving user authentication information wherein the user authentication information includes identification data and a passcode;
a first communication subsystem to communicate with the user through a user connection to an automated telephone system during a first portion of the communication session;
a first transfer subsystem to transfer the user connection from the automated system to a communication device associated with a representative during the communication session and providing the authentication information for the communication session from the automated telephone system to the representative, the transferring of the user connection to the communication device and the providing of the authentication information enabling communication between the user and the representative during a second portion of the communication session, the second portion occurring after the first portion;
a second transfer subsystem to transfer the user connection from the automated telephone system to a communication device associated with a representative during the communication session and provide authentication information for the communication session from the automated telephone system to the representative, the transfer of the user connection to the communication device and providing the authentication information enabling communication between the user and the representative during a second portion of the communication session, the second portion occurring after the first portion;
a third transfer subsystem to transfer the user connection from the communication device associated with the representative back to the automated telephone system during the communication session;
an authentication receiver subsystem to receive the authentication information from the representative based on the transfer back to the automated telephone system; and
a second communication subsystem to communicate with the user through the user connection to the automated telephone system during a third portion of the communication session based on the transfer of the user and receipt of the authentication information, the third portion occurring after the second portion, and an entry point subsystem to receive a non-initial entry point data token in a customer process from the representative, based on the transfer back to the automated telephone system, wherein communication with the user through the user connection to the automated telephone system during the third portion of the communication session is based on the transfer of the user, the receiving of the authentication information, and receipt of the non-initial entry point data token.

6. The system of claim 5, further comprising:

a calling selection subsystem to receive a call from the user, provide a prompt to the user to select interaction with the automated system or the representative, and receive a selection to interact with the automated system, wherein communication with the user through the automated telephone system is based on receipt of the selection.

7. The method of claim 1, wherein the non-initial entry point data token represents a non-initial entry point from a payment collection point.

8. The method of claim 1, wherein the providing of the authentication information for the communication session from the automated telephone system is to the communication device of the representative, and the receiving the authentication information is from the communication device of the representative.

9. The method of claim 3, wherein the non-initial entry point data token represents a non-initial entry point from a payment collection point.

10. The computer-readable storage medium of claim 3, wherein providing the authentication information for the communication session from the automated telephone system is to the communication device of the representative, and receiving the authentication information is from the communication device of the representative.

11. The system of claim 5, wherein the non-initial entry point data token represents a non-initial entry point from a payment collection point.

12. The system of claim 5, wherein providing the authentication information for the communication session from the automated telephone system is to the communication device of the representative, and receiving the authentication information is from the communication device of the representative.

* * * * *